(12) United States Patent
Lee

(10) Patent No.: US 10,264,623 B2
(45) Date of Patent: Apr. 16, 2019

(54) METHOD AND APPARTUS FOR SUPPORTING A MISSION CRITICAL PUSH TO TALK SERVICE IN A WIRELESS ACCESS SYSTEM

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/323,082

(22) PCT Filed: Jun. 30, 2015

(86) PCT No.: PCT/KR2015/006700
§ 371 (c)(1),
(2) Date: Dec. 29, 2016

(87) PCT Pub. No.: WO2016/003157
PCT Pub. Date: Jan. 7, 2016

(65) Prior Publication Data
US 2017/0142756 A1    May 18, 2017

Related U.S. Application Data

(60) Provisional application No. 62/019,382, filed on Jun. 30, 2014.

(51) Int. Cl.
*H04H 20/71* (2008.01)
*H04W 76/45* (2018.01)
(Continued)

(52) U.S. Cl.
CPC ............ *H04W 76/45* (2018.02); *H04W 4/02* (2013.01); *H04W 4/10* (2013.01);
(Continued)

(58) Field of Classification Search
CPC ........ H04W 4/06; H04W 84/18; H04W 84/12
See application file for complete search history.

(56) References Cited

U.S. PATENT DOCUMENTS

2007/0133455 A1    6/2007  Kuchibhotla et al.
2010/0015974 A1*   1/2010  Stubbings ............... H04W 4/10
                                                    455/434

(Continued)

OTHER PUBLICATIONS

PCT International Application No. PCT/KR2015/006700, Notification of Transmittal of the International Search Report and the Written Opinion of the International Searching Authority, or Declaration dated Oct. 22, 2015, 10 pages.

(Continued)

*Primary Examiner* — Siren Wei
(74) *Attorney, Agent, or Firm* — Lee Hong Degerman Kang Waimey

(57) ABSTRACT

The present invention provides a method and apparatus for supporting a MCPTT services. One of the methods according to embodiments of the present invention comprises steps of receiving a location information request message from a enhance Node B (eNB) during a random access procedure; transmitting a connection request message including location information of the UE through a control channel to the eNB; and performing the MCPTT service with two or more users, wherein the random access procedure is performed for an initiation of the MCPTT service, and the MCPTT service is used for a public safety and utility services and provides communication among the two or more users with the UE.

16 Claims, 10 Drawing Sheets

(51) Int. Cl.
*H04W 4/10* (2009.01)
*H04W 76/00* (2018.01)
*H04W 4/02* (2018.01)
*H04W 74/08* (2009.01)
*H04W 4/90* (2018.01)

(52) U.S. Cl.
CPC ....... *H04W 74/0833* (2013.01); *H04W 76/00* (2013.01); *H04W 4/90* (2018.02)

(56) References Cited

U.S. PATENT DOCUMENTS

| | | | | |
|---|---|---|---|---|
| 2013/0021965 A1* | 1/2013 | Chu | ........................ | H04W 4/10 370/328 |
| 2013/0130723 A1 | 5/2013 | Kone | | |
| 2014/0011519 A1 | 1/2014 | Lee et al. | | |
| 2014/0029586 A1* | 1/2014 | Loehr | ............... | H04W 56/0005 370/336 |
| 2014/0220974 A1* | 8/2014 | Hsu | ................... | H04W 36/0088 455/436 |
| 2015/0350098 A1* | 12/2015 | Du | ......................... | H04W 4/08 370/328 |

OTHER PUBLICATIONS

Home Office, "Proposed Security Requirements for MCPTT", S1-141030, 3GPP TSGSA WG1 Meeting #66, May 2014, 2 pages.
3rd Generation Partnership Project (3GPP), "Technical Specification Group Services and System Aspects; Mission Critical Push to Talk MCPTT; (Release 13)," 3GPP TS 22.179 V0.4.0, May 2014, 25 pages.

* cited by examiner

FIG. 3
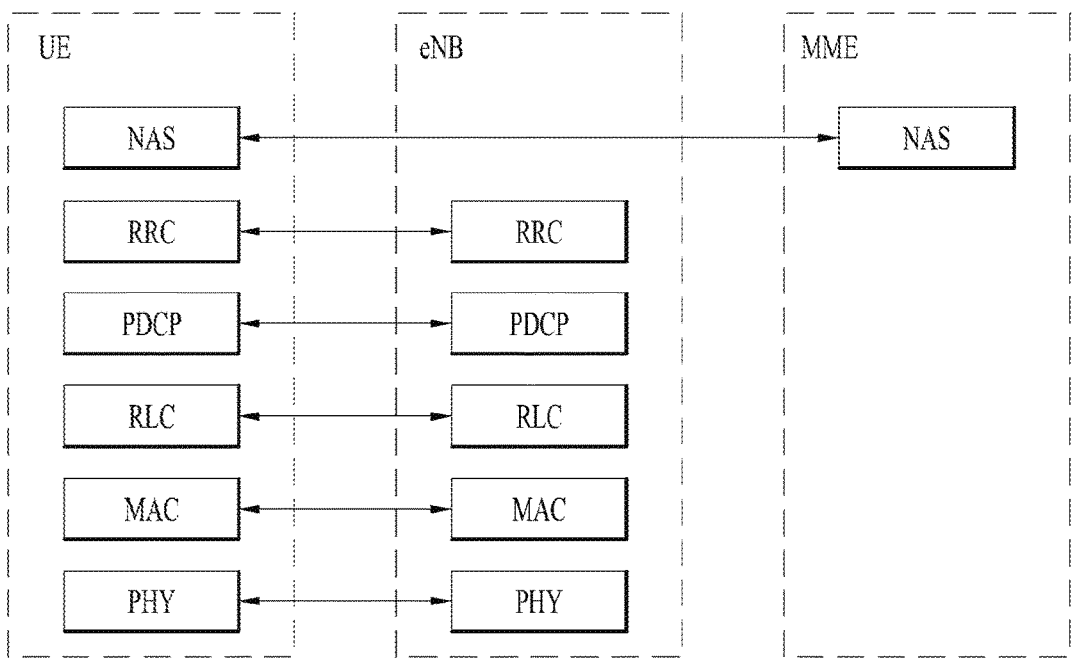
( a ) Control-Plane Protocol Stack
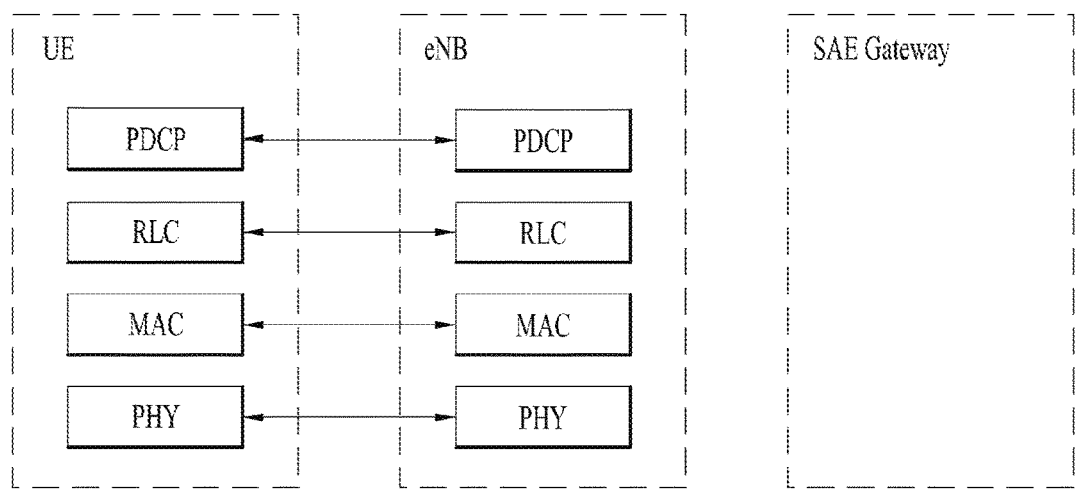
( b ) User-Plane Protocol Stack

METHOD AND APPARATUS FOR SUPPORTING A MISSION CRITICAL PUSH TO TALK SERVICE IN A WIRELESS ACCESS SYSTEM

CROSS-REFERENCE TO RELATED APPLICATIONS

This application is a National Stage filing under 35 U.S.C. 371 of International Application No. PCT/KR2015/006700, filed on Jun. 30, 2015, which claims the benefit of U.S. Provisional Application No. 62/019,382, filed on Jun. 30, 2014, the contents of which are hereby incorporated by reference herein in their entirety.

TECHNICAL FIELD

The present invention relates to a wireless access system, and more particularly, to methods and apparatus for supporting a Mission Critical Push To Talk (MCPTT) service.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide methods for supporting the MCPTT service.

Another object of the present invention is to provide methods how to efficiently use the MCPTT service.

Still another object of the present invention is to provide method for reporting location information of user equipment (UE) for the MCPTT service.

Still another object of the present application is to provide method for providing location information of the UE in order to support the MCPTT service, in aspect of a base station or other location service entity in LTE/LTE-A systems.

Still another object of the present invention is to provide apparatus such as a user equipment (UE) and/or a base station for supporting the above-described methods.

Technical problems to be solved by the present invention are not limited to the above-mentioned technical problem, and other technical problems not mentioned above can be clearly understood by one skilled in the art from the following description.

Technical Solution

The present invention relates to a method and apparatus for supporting MCPTT service.

In one aspect of the present invention, a method for reporting location information in a wireless access system supporting a Mission Critical Push to Talk (MCPTT) service, the method performed by a user equipment (UE) and comprising: receiving a location information request message from a enhance Node B (eNB) during a random access procedure; transmitting a connection request message including location information of the UE through a control channel to the eNB; and performing the MCPTT service with two or more users, wherein the random access procedure is performed for an initiation of the MCPTT service, and the MCPTT service is used for a public safety and utility services and provides communication among the two or more users with the UE.

In another aspect of the present invention, a user equipment (UE) for reporting location information in a wireless access system supporting a Mission Critical Push to Talk (MCPTT) service, the UE comprising a receiver, a transmitter, and a processor configured to support of location information reporting by controlling the receiver and the transmitter.

The processor may be configured to receive, via the receiver, a location information request message from a enhance Node B (eNB) during a random access procedure; transmit, via the transmitter, a connection request message including location information of the UE through a control channel to the eNB; and perform, by controlling the receiver and the transmitter, the MCPTT service with two or more users, wherein the random access procedure is performed for an initiation of the MCPTT service, and the MCPTT service is used for a public safety and utility services and provides communication among the two or more users with the UE.

The connection request message may be transmitted during the random access procedure or immediately after the random access procedure.

The method further comprising step of receiving a system information block (SIB) message including a ptt-reportFrequency field, wherein the ptt-reportfrequency field indicating reporting the location information (1) every the random access procedure for the MCPTT, (2) every n-th random access procedure for the MCPTT, or (3) every m seconds.

If the ptt-reportfrequency field indicates reporting the location information every n-th random access procedure for the MCPTT, the SIB message further includes a ptt-reportNumber field indicating a number value of 'n' representing attempting number of the random access procedure, where 'n' is integer value. In this case, the connection request message may be transmitted only if a refresh period is reached to a maximum refresh period, and the maximum refresh period is set based on the ptt-reportfrequency field and the ptt-reportNumber field.

If the ptt-reportfrequency field indicates reporting the location information every m seconds, the SIB message further includes a ptt-reportTimer field indicating a time value 'm' for the random access procedure, where 'm' is integer value. In this case, the connection request message is transmitted only if a refresh period is reached to a maximum refresh period, and the maximum refresh period is set based on the ptt-reportfrequency field and the ptt-reportTimer field.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, by providing the location information of the UE, the MCPTT service can be provided more exactly and efficiently because the MCPTT service is provided based on the location of the users.

Secondly, it is possible to efficiently report the location information of the UE during the random access procedure for the MCPTT service.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 illustrates the configurations of a radio interface protocol between the E-UTRAN and a UE;

MODE FOR INVENTION

Figure 1:
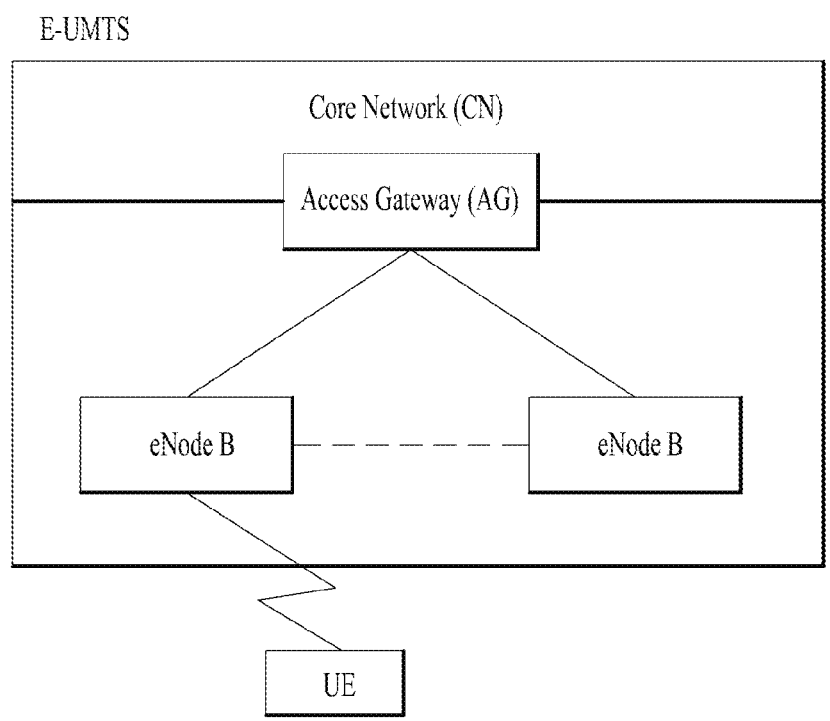
FIG. 1 illustrates a schematic structure a network structure of an evolved universal mobile telecommunication system (E-UMTS)

Exemplary embodiments of the present invention provides a method and apparatus for supporting a MCPTT services.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.011, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 8 to Release 11 of "3rd Generation Partnership Project; Technical Specification Group Radio Access Network".

Referring to FIG. 1, the E-UMTS mainly includes a User Equipment (UE), base stations (BSs, or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
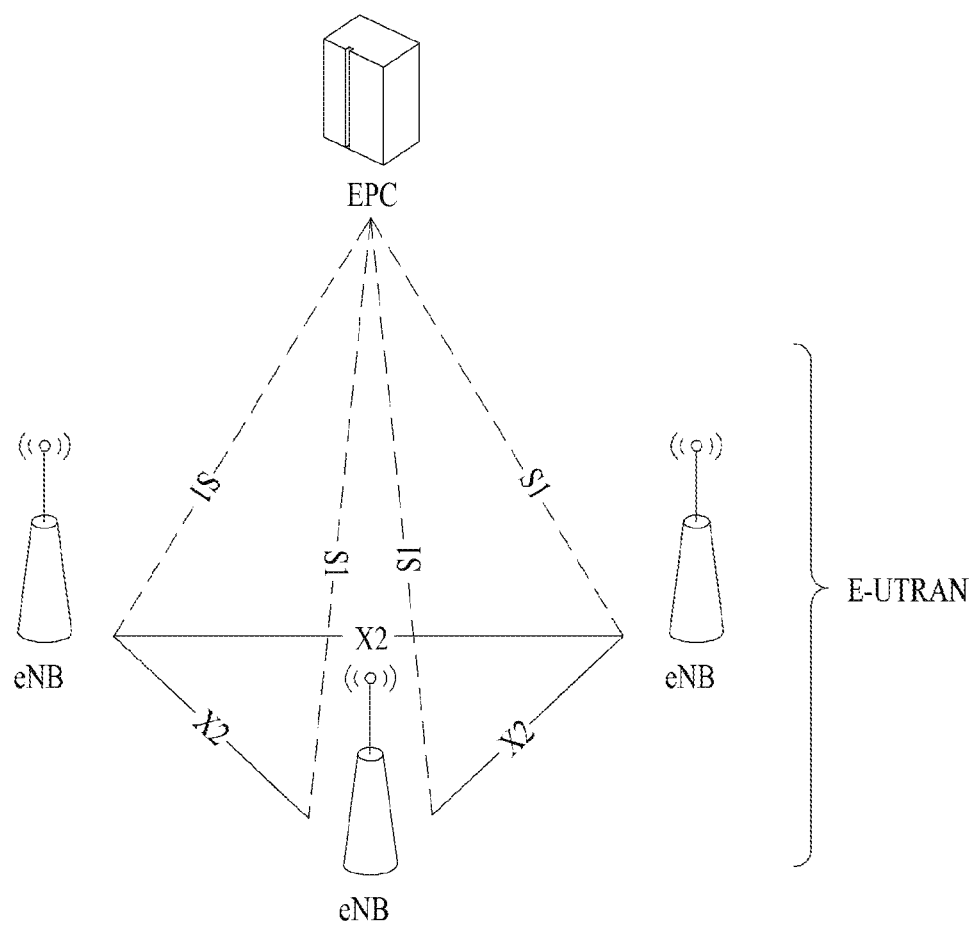
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes one or more base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, reconfiguration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Initial Access Procedure

The initial access procedure may be configured with a cell search procedure, a system information acquisition procedure and a random access procedure.

Figure 4:
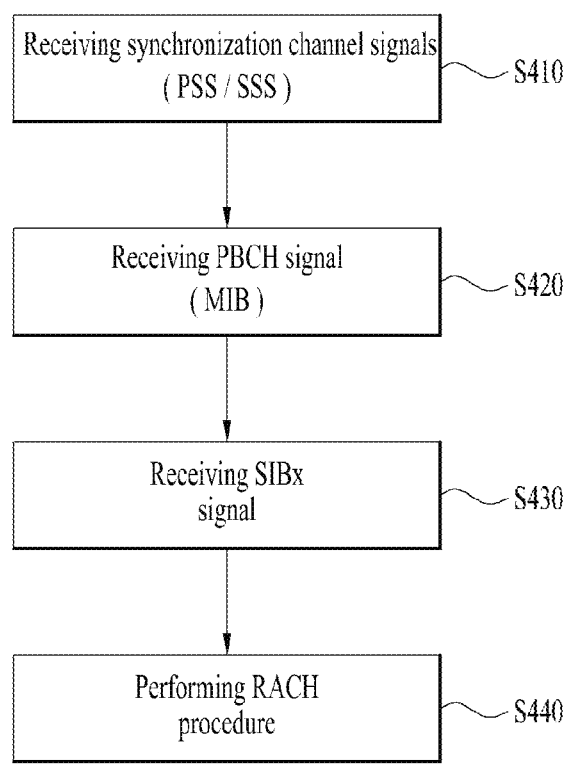
FIG. 4 illustrates one of examples of the initial access procedure used in LTE/LTE-A systems.

FIG. 4 illustrates one of examples of the initial access procedure used in LTE/LTE-A systems.

UE may acquire downlink synchronization information by receiving a Primary Synchronization Signal (PSS) and a Secondary Synchronization Signal (SSS) which are transmitted from the eNB. The synchronization signals are transmitted twice every frame unit. That is, the synchronization signals are transmitted at every 5 ms (S410).

A Physical Cell ID (PCID), downlink time and frequency synchronization information, and length information of cyclic prefix (CP) may be included in the synchronization signals at step S410.

And then, the UE receives Physical Broadcast Channel (PBCH) signals transmitted through a PBCH. In this case, the PBCH signals are repeatedly transmitted 4 times by using different scrambling sequences each other during 4 frames (i.e., 40 ms).

The PBCH signals includes Master Information Block (MIB) which is one of system information. One MIB is configured with 24 bits and 14 bits of them are used for representing physical HARQ indication channel (PHICH) configuration information, downlink cell bandwidth (dl-bandwidth) information, and a System Frame Number (SFN). The rest 10 bits can be configured as reserved bits.

After then, the UE is able to acquire other system information by receiving individual System Information Block (SIB)s transmitted from the eNB. The SIBs are transmitted on DL-SCH, and it is checked that whether the SIBs exist or not by receiving PDCCH signals masked with System Information Radio Network Temporary Identities (SI-RNTI).

System Information Block type 1 (SIB1) of SIBs includes parameters necessary for deciding the cell is suitable for a sell selection or not and time domain scheduling information for the other SIBs. SIB2 includes common channel information and shared channel information. SIB3 to SIB8 includes cell reselection related information, Inter-Frequency information, and/or Intra-Frequency information. SIB9 is used for transferring a name of a Home eNodeB (HeNB), and SIB10-SIB12 includes waring messages for an Earthquake and Tsunami Warning Service (ETWS) and a Commercial Mobile Alert System (CMSA). Lastly, SIB13 includes control information related to MBMS.

The UE is able to perform the random access procedure after performing steps S410 to S430. Especially, the UE may acquire parameters for transmitting Physical Random Access Channel (PRACH) by receiving the SIB2 from above described SIBs. Accordingly, the UE is able to perform the random access procedure with the eNB by generating and transmitting the PRACH signal based on the parameters included in the SIB2.

1.3 Random Access Procedure 1.3.1 Contention-Based Random Access Procedure

Figure 5:
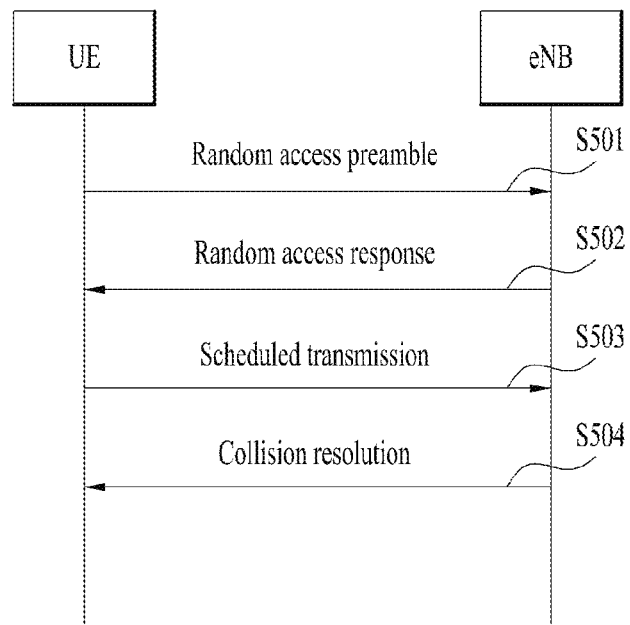
FIG. 5 illustrates an operation performed between a UE and an eNB in a contention-based random access procedure.

FIG. 5 illustrates an operation performed between a UE and an eNB in a contention-based random access procedure.

(1) Transmission of First Message (Msg1)

First, the UE may randomly select a random access preamble from a set of random access preambles indicated by system information or a Handover Command message, select Physical RACH (PRACH) resources, and transmit the selected random access preamble in the PRACH resources to the eNB (S501).

(2) Reception of Second Message (Msg2)

After transmitting the random access preamble in step S501, the UE attempts to receive a random access response within a random access response reception window indicated by the system information or the Handover Command message from the eNB (S502).

Random access response information may be transmitted in a Medium Access Control (MAC) Packet Data Unit (PDU) and the MAC PDU may be transmitted on a PDSCH in step S502. To receive information on the PDSCH successfully, the UE preferably monitors a Physical Downlink Control Channel (PDCCH). The PDCCH may deliver information about a UE to receive the PDSCH, time and frequency information about radio resources of the PDSCH, and information about the transport format of the PDSCH. Once the UE successfully receives the PDCCH directed to it, the UE may appropriately receive a random access response on the PDSCH based on information of the PDCCH. The random access response may include a Random Access Preamble Identifier (RAPID), an UpLink (UL) Grant indicating UL radio resources, a temporary Cell-Radio Network Temporary Identifier (C-RNTI), and a Timing Advance Command (TAC).

The reason for including an RAPID in the random access response is that one random access response may include random access response information for one or more UEs and thus it is necessary to indicate a UE for which the UL Grant, the temporary C-RNTI, and the TAC are valid. Herein, it is assumed that the UE selects an RAPID matching the random access preamble selected by the UE in step S501.

(3) Transmission of Third Message (Msg 3)

If the UE receives a random access response valid for it, the UE processes information included in the random access response. That is, the UE applies the TAC and stores the temporary C-RNTI. In addition, the UE may store data to be transmitted in response to the reception of the valid random access response in an Msg 3 buffer.

Meanwhile, the UE transmits data (i.e., a third message) to the eNB based on the received UL Grant (S403).

The third message should include an ID of the UE. In the contention-based random access procedure, the eNB may not determine which UE is performing the random access procedure and should identify the UE to resolve collision later.

(4) Reception of Fourth Message (Msg 4)

After transmitting the data including its ID based on the UL Grant included in the random access response, the UE awaits reception of a command from the eNB, for contention resolution. That is, the UE attempts to receive a PDCCH, for reception of a specific message (S404).

From the perspective of the physical layer, a Layer 1 (L1) random access procedure refers to transmission and reception of a random access preamble and a random access response in steps S701 and S702. The other messages are transmitted on a shared data channel by a higher layer, which is not considered to fall into the L1 random access procedure.

An RACH is configured to a size of 6 RBs in one or more contiguous subframes reserved for transmission of a random access preamble. The L1 random access procedure is triggered by a preamble transmission request from a higher layer. A preamble index, a target preamble reception power PREAMBLE_RECEIVED_TARGET_POWER, a matching RA-RNTI, and PRACH resources are part of the preamble transmission request, indicated by the higher layer.

Preamble transmission power PPRACH is calculated by [Math Figure 1].

$$PRACH = \min P_{CMAX,c}(i),$$
$$PREAMBLE_{RECEIVED_{TARGET_{POWER}}} + PL_c[dBm]$$
[Math Figure 1]

In [Math Figure 1], $P_{CMAX,c}^{(i)}$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power PPRACH using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

1.3.2 Contention-Free Random Access Procedure

Figure 6:
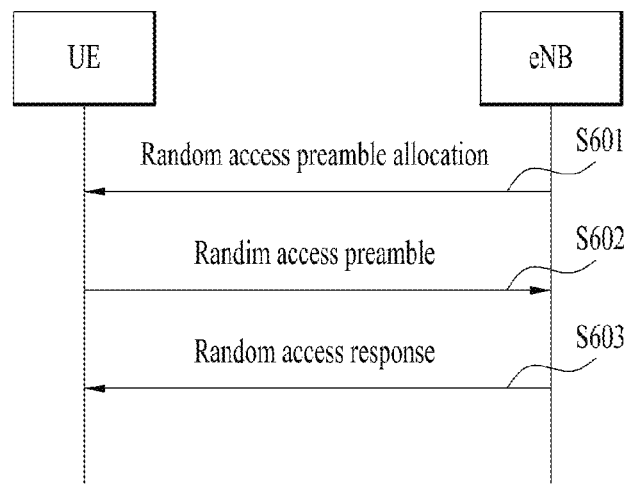
FIG. 6 illustrates an operation between a UE and an eNB in a contention-free random access procedure.

FIG. 6 illustrates an operation between a UE and an eNB in a contention-free random access procedure.

Compared to the contention-based random access procedure illustrated in FIG. 5, the contention-free random access procedure ends simply by transmitting the first and second messages. However, before a UE transmits a random access preamble as a first message to an eNB, the eNB allocates the random access preamble to the UE. Then the UE transmits the random access preamble as the first message to the eNB and receives a random access response from the eNB. Thus, the random access procedure ends.

The contention-free random access procedure may be performed in the event of handover or upon request by a command from the eNB. In both cases, the contention-based random access procedure may also be performed.

Referring to FIG. 6, the eNB allocates a dedicated random access preamble that is not likely to collide to the UE, for the contention-free random access procedure. For example, the eNB may indicate the random access preamble to the UE by a Handover Command or a PDCCH order (S601).

The UE transmits the allocated dedicated random access preamble as the first message to the eNB and receives a random access response message in response to the random access preamble from the eNB. Random access response information is received in the same manner as in the contention-based random access procedure illustrated in FIG. 6 (S602 and S603).

2. Mission Critical Push to Talk (MCPTT)

2.1 overview on MCPTT

Figure 7:
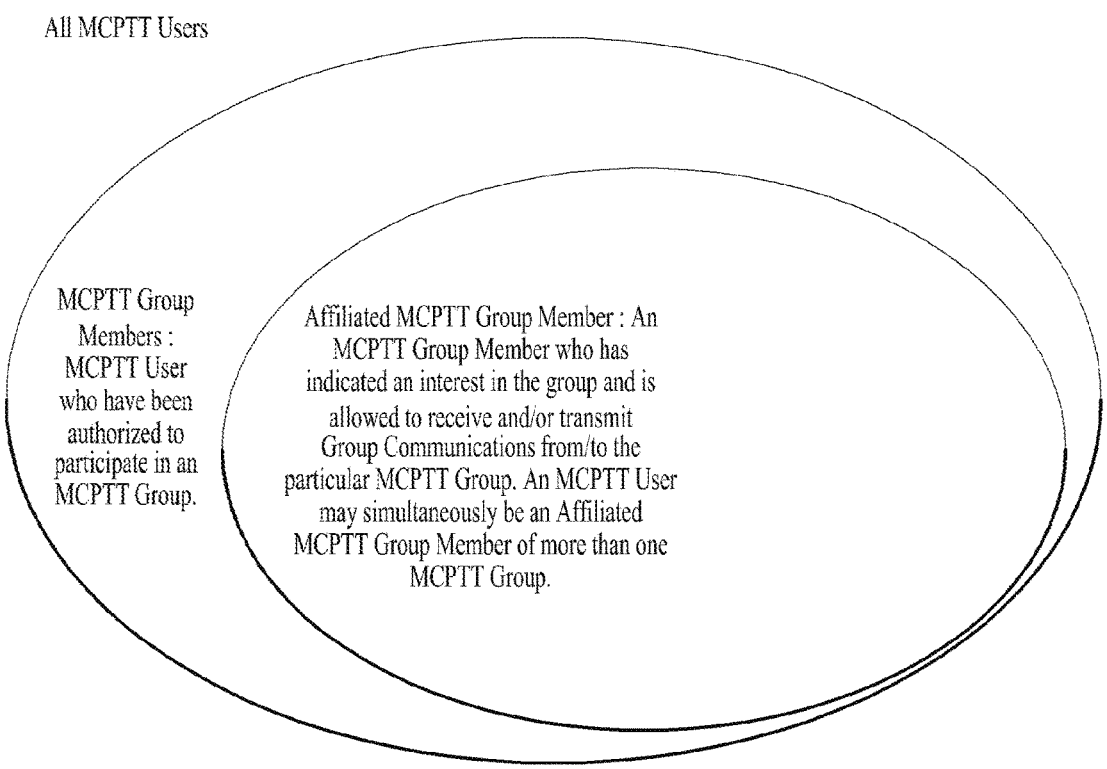
FIG. 7 illustrates user categories for MCPTT groups.

FIG. 7 illustrates user categories for MCPTT groups.

A Push To Talk (PTT) service provides an arbitrated method by which two or more users may engage in communication. Users may request permission to transmit (e.g., traditionally by means of a press of a button). The MCPTT service over LTE/LTE-A system supports an enhanced PTT service, suitable for mission critical scenarios, based upon 3GPP Evolved Packet System (EPS) services. The examples of the mission critical scenarios may be a public safety and utility services such as rail roads, water works, and electricity etc. In addition, the requirements for MCPTT service defined within can also form the basis for a non-mission critical push to talk (PTT) service.

The MCPTT service is intended to support communication between several users (a group call), where each user has the ability to gain access to the right to talk in an arbitrated manner. However, the MCPTT service also supports private calls between pairs of users. The MCPTT service builds on the existing 3GPP transport communication mechanisms provided by the EPS architectures to establish, maintain, and terminate the actual communication path(s) among the users. The MCPTT service also builds upon service enablers, such as GCSE_LTE (Group Communication System Enablers for LTE) and ProSe (Proximity Services).

The MCPTT service allows users to request the right to talk (transmit voice/audio) and provides a deterministic mechanism to arbitrate between requests that are in contention (i.e., floor control). When multiple requests occur, the determination of which user's request is accepted and which users' requests are rejected or queued is based upon a number of characteristics (including the respective priorities of the users in contention). The MCPTT service provides a means for a user with higher priority (e.g., emergency condition) to override (interrupt) the current talker. The MCPTT service also supports a mechanism to limit the time a user is able to talk (hold the floor) thus permitting users of the same or lower priority a chance to gain the floor.

The MCPTT service provides the means for a user to monitor activity on a number of separate calls and enables the user to switch focus to a chosen call. An MCPTT service user may join an already established MCPTT group call (late call entry). In addition the MCPTT service provides Talker ID and user location determination features.

The users of an MCPTT service may have more stringent expectations of performance than the users of a commercial PTT service. The MCPTT service can be used by non-mission critical users (e.g., utility companies and railways) under very exceptional cases.

The relationship between MCPTT users and MCPTT Groups is shown in FIG. 1. Referring to FIG. 1, the MCPTT group Members includes the affiliated MCPTT group Member. In this case, the MCPTT group members represent MCPTT users who have been authorized to participate in an MCPTT group and the affiliated MCPTT group members represent an MCPTT group member who has indicated an interest in the group and is allowed to receive and/or transmit Group communications from/to the particular MCPTT group. The MCPTT users may simultaneously be an Affiliated MCPTT group member of more than one MCPTT group.

2.2 Definitions in MCPTT

Hereinafter, terminologies and definitions for MCPTT services are more specifically described and the terminologies and definitions can be applied to the embodiments of the present application.

For the purposes of the present application, the terms and definitions given in TR 21.905 document and the following can be applied. A term defined in the present application takes precedence over the definition of the same term, if any, in TR 21.905 document.

The Affiliated MCPTT Group Member means an MCPTT Group Member who has indicated an interest in the group and is allowed to receive and/or transmit Group Communications from/to the particular MCPTT Group. An MCPTT User may simultaneously be an Affiliated MCPTT Group Member of more than one MCPTT Group.

A Broadcast Group Call means a group call where the initiating MCPTT user expects no response from the other MCPTT users, so that when his transmission is complete, so is the call. The target MCPTT users may be a subset of all of the system users, or it may be all of the system users.

An emergency State represents a heightened condition of alarm for an MCPTT user indicating a need for immediate assistance due to a personal life-threatening situation.

A floor control is the arbitration system in the MCPTT service that determines who has the authority to transmit (talk) at a point in time. This functionality is used in MCPTT One-to-one Calls and MCPTT Group Calls.

A group-Broadcast Group means a collection of groups defined by the MCPTT Administrator (e.g. representing a particular organizational structure) and intended to be the recipients of Broadcast Group Calls.

A group Regroup means a temporary combining of a multiplicity of groups into a single group.

An imminent Peril call means a call prioritized in the event of immediate threat to any human life such as resulting from an authorized user's observation of or engagement in a situation involving imminent peril to the general public (e.g., forest fire about to encircle campers, tanker truck ready to explode near a school, casualties at scene of a car bombing). The imminent peril is an urgent call and highlights the potential of death or serious injury.

An in-progress Emergency means an emergency condition for a group that has been accepted by MCPTT service, but has not yet been cancelled by an authorized user.

An in-progress Imminent Peril means an Imminent Peril Group Call was granted and it has not yet been cancelled by an authorized user.

A location means the current physical location (i.e., co-ordinates plus estimated accuracy and timestamp) of the MCPTT UE that can be cross-referenced to a map.

A losing audio means audio of an overridden talker that is not dismissed, but instead allowed to be routed to suitable authorized receivers.

A MCPTT Emergency Alert means a notification from the MCPTT UE to the MCPTT service that the MCPTT User has an emergency condition.

A MCPTT Emergency Group Call means a group call processed with a very high level of priority. If required, in-progress group calls are pre-empted in order to provide the resources for the Emergency Group Call.

A MCPTT Emergency State means a heightened condition of alarm for an MCPTT user indicating a need for immediate assistance due to a personal life-threatening situation.

A MCPTT Group means a GCSE Group being used for MCPTT.

A MCPTT Group Member means an MCPTT User who has been authorized to participate in Group Communications of a particular MCPTT Group. An MCPTT user may simultaneously be a group member of one or more MCPTT groups.

A MCPTT user means a user, identified by a subscription to an MCPTT Service, who has a UE with the capability to participate in MCPTT services.

A participant means an MCPTT User who is currently receiving and/or transmitting in an MCPTT Group Call or a 1:1 (private) call.

A participant type means a functional category of the participant (e.g. Normal, Supervisor, Dispatch, Supervisor Dispatch), typically defined by the MCPTT Administrators. At any moment in time in a call, a participant is of only one type.

A personality provisioning means the ability to implement into an MCPTT UE the characteristics indicative of a specific agency's user(s) with particular access to MCPTT Groups associated with that agency. These characteristics may include Group IDs, Group ID alias, Talker ID, Talker ID alias, Group scanning lists, and other parameters that are required by an MCPTT user when using MCPTT Service.

A pre-emption means the act of terminating on-going calls in order to free up resources for a higher priority call request.

A Project 25 RFSS means a Project 25 Radio Frequency (RF) Subsystem as defined in the TIA-102 specifications.

A MCPTT request means the action taken by an MCPTT user to request the right to transmit voice on a MCPTT Session.

A MCPTT session means a MCPTT Session is an audio communication session established between MCPTT users.

A receiving MCPTT Group Member means an Affiliated MCPTT Group Member who is currently receiving Group Communication from an MCPTT Group.

A selected MCPTT Group means the MCPTT Group that a particular MCPTT Group Member uses for transmission. An MCPTT Group Member may have zero, one or multiple Selected MCPTT Groups.

A System Call means a special case of a Broadcast Group Call that is transmitted to all users in a dynamically defined geographic area.

A Talker ID means an application layer identity that uniquely identifies the current speaker and may represent either an MCPTT User or, in P25 systems, a subscriber unit.

A Top of Queue means that when resources are not available to grant a call request, groups with "top of queue" priority are queued and are allocated system resources prior to any lower priority call requests.

A transmitting MCPTT Group Member means an Affiliated MCPTT Group Member who is currently transmitting a Group Communication to a Selected MCPTT Group.

A User-Broadcast Group means a collection of users defined by the MCPTT Administrator (e.g. representing a particular organizational structure) and intended to be the recipients of Broadcast Group Calls.

A User Regroup means the temporary combining of a multiplicity of users into a new group.

3. Location information reporting in MCPTT 3.1 Problem statement

In 3GPP LTE/LTE-A systems, there are service requirements on using the talker's location information as follows.

The MCPTT service may be capable of providing the location information of the current talker to an authorized user, subject to privacy restrictions. An authorized MCPTT user may be able to restrict the MCPTT UE from supplying location information to the MCPTT service. The MCPTT service may support conveyance of precise location information provided by the MCPTT UE. The MCPTT service may support conveyance of location information provided by 3GPP/LTE location services. The MCPTT service may provide for the flexibility to convey future formats of location information. The MCPTT service may provide a means for an authorized user to restrict the dissemination of his location information. The MCPTT service may provide a means for MCPTT Administrators to manage the privacy of location information for MCPTT Users within their authority. The MCPTT service may provide end-to-end confidentiality of location information. The MCPTT service may provide authentication of messages carrying location information.

However, the 3GPP LTE/LTE-A systems do not precisely define how to report the location information in MCPTT services. Accordingly, based on these set of requirements, it is proposed to devise methods to report the location of a talker or a potential talker in this invention disclosure.

3.2 Location information reporting in RACH procedure

Figure 8:
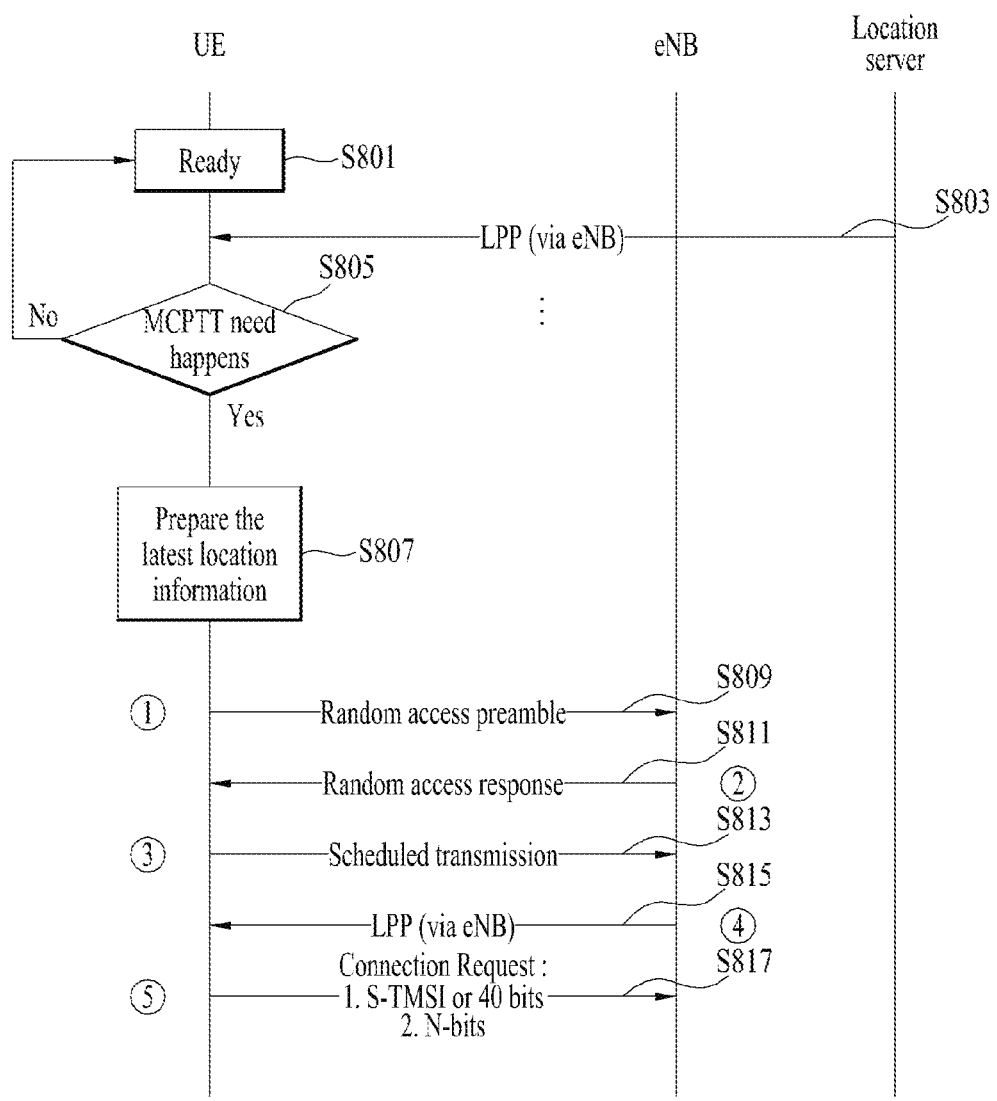
FIG. 8 illustrates a flowchart illustrating one of methods for reporting location information of the UE according to embodiments.

FIG. 8 illustrates a flowchart illustrating one of methods for reporting location information of the UE according to embodiments.

The embodiment of FIG. 8 illustrates that the UE reports the location information to the eNB or the other PTT party whenever the UE performs random access procedure. In this case, the eNB can be seen as the MCPTT taking counterpart member depending on situation.

In FIG. 8, it is assumed that the UE and the eNB can support the MCTPP services and the location information of the UE can be managed and controlled by a location server.

In this case, the location server is a physical or logical entity (e.g., an Enhanced Serving Mobile Location Centre (E-SMLC) or a Secure User Plane Location (SUPL) SUPL Location Platform (SLP)) that manages positioning for a target device (e.g., the UE) by obtaining measurements and other location information from one or more positioning units and providing assistance data to positioning units to help determine this. The location server may also compute or verify the final location estimate. In addition, a LTE Positioning Protocol (LPP) is used point-to-point between a location server (e.g., E-SMLC or SLP) and the target device in order to position the target device using position-related measurements obtained by one or more reference sources transmitted from the eNB.

Referring to FIG. 8, the UE is ready for MCPTT service and the UE may be in an idle state or normal state (S801).

The location server transmits a LPP message requesting location information of the UE. That is, the location server sends the LLP message (e.g., RequestLocationInformation message) to the UE to request the location information, indicating the type of location information needed and potentially the associated QoS (S803).

After receiving the LPP message, the UE check the MCPTT service is needed to be happened (S805).

If the UE has to take the MCPTT service, the UE will perform a random access procedure with the eNB in order to access the network and initiate the MCPTT service. Before performing the random access procedure, the UE prepares and stores the latest location information which had been measured after receiving the LPP message from the location server (S807).

And then, the UE performs the random access procedure with the eNB as described on FIG. 5 or 6 and description thereof at the steps of S809 to S813.

During the random access procedure, the eNB is able to transmit the LPP message requesting the location information of the UE (S815).

If the UE receives the LPP message during the random access procedure, the UE transmits the RRC connection request message including the location information of the UE to the eNB during the random access procedure. In this case, the location information of the UE is able to be transmitted via a control channel. By doing this, the location information can be transmitted prior to a data transmission (e.g., the MCPTT data) between the UE and the eNB and this can guarantee a stable transmission of the location information even though traffic channel of the eNB congestion exists (S817).

At the step of S817, the UE may set contents of the RRC connection request message as follows. For example, the UE sets a UE identifier to the value (e.g., an S-TMSI (System Architecture Evolution Temporary Mobile Station Identifier)) if upper layers provided it. If the upper layers do not provide the value, the UE draw a random value in the range $0 \ldots 2^{40}-1$ and set the UE identifier to this value.

In addition, the UE sets an establishment cause field in accordance with the information received from upper layers and the UE sets the location information as the contents of the RRC connection request message. In this case, the location information can be set as location vectors, such as an element 1 of N1-bits long and an element 2 of N2-bits long. If location information report is 2 dimensional, the element 1 and the element 2 are used while if location information report is 3 dimensional, the element 1, the element 2 and an element 3 can be used; (N=N1+N2+N3). After set the contents, the UE transmits the RRC connection request message during the random access procedure.

The following table 1 is one of formats of the RRC connection request message can be used in the embodiments.

TABLE 1

RRCConnectionRequest message
-- ASN1START
RRCConnectionRequest ::=      SEQUENCE {
    criticalExtensions              CHOICE {
        rrcConnectionRequest-r8         RRCConnectionRequest-r8-IEs, TABLE 1-continued

```
        criticalExtensionsFuture       SEQUENCE { }
    }
}
RRCConnectionRequest-r8-IEs ::= SEQUENCE {
    ue-Identity                     InitialUE-Identity,
    ue-LocationInfo                 InitialUE-LocationInfo,
    establishmentCause              EstablishmentCause,
    spare                           BIT STRING (SIZE (1))
}
InitialUE-Identity ::=              CHOICE {
    s-TMSI                          S-TMSI,
    randomValue                     BIT STRING (SIZE (40))
}
InitialUE-LocationInfo ::=          CHOICE {
    Two-Dimension                   BIT STRING (SIZE (N))  // N is an integer
    Three-Dimension                 BIT STRING (SIZE (N))  // N is an integer
}
EstablishmentCause ::=              ENUMERATED {
                                        emergency, highPriorityAccess, mt-Access, mo-Signalling,
                                        mo-Data, delayTolerantAccess-v1020, spare2, spare1 }
-- ASN1STOP
```

Referring to Table 1, the location information of the UE is included in the RRCConnectionRequest information element (IE). The RRCConnectionRequest IE includes the ue-Identity field identifying the UE, the ue-LocationInfo field representing the UE location information included to support the location information on the UE for particular purpose, and the establishmentCause field indicating the reason why the RRC connection request message is transmitted.

In addition, referring to Table 1, the location information of the UE (i.e., InitialUE-LocationInfo field) can be configured with N bit string to indicate the location of the UE as two or three dimension. At the Table 1, the three-dimension can be used for indicating the location information when the UE is located in indoor position.

Referring back to FIG. 8, the UE is able to transmit the location information at the step S813. However, at the step S813, the UE does not receive contention resolution message from the eNB, so it is possible that the UE can be collided with another UE. In this case, the radio resources can be wasted. On the contrary, if the UE transmits the location information at the step S817, the contention had been resolved, so there is no case to collide with another UE and the location information reporting can be guaranteed.

3.3 SIBx Messages Defined for Embodiments

Hereinafter, SIB messages used in embodiments of the present invention are described firstly. The following Table 2 is one of formats for the SIB message.

TABLE 2

```
-- ASN1START
SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig           OPTIONAL, -- Need OP
        ac-BarringForMO-Data                AC-BarringConfig           OPTIONAL  -- Need OP
    }                                                                  OPTIONAL, -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA           OPTIONAL, -- Need
OP
        ul-Bandwidth                        ENUMERATED {n6, n15, n25, n50, n75, n100}
                                                                       OPTIONAL, -- Need
OP
        additionalSpectrumEmission          AdditionalSpectrumEmission
    },
    mbsfn-SubframeConfigList            MBSFN-SubframeConfigList       OPTIONAL, -- Need OR
    timeAlignmentTimerCommon            TimeAlignmentTimer,
    ...,
    lateNonCriticalExtension            OCTET STRING (CONTAINING SystemInformationBlockType2-v8h0-IEs)
                                                         OPTIONAL,
    [[  ssac-BarringForMMTEL-Voice-r9   AC-BarringConfig               OPTIONAL, -- Need OP
        ssac-BarringForMMTEL-Video-r9   AC-BarringConfig               OPTIONAL  -- Need OP
    ]],
    [[  ac-BarringForCSFB-r10           AC-BarringConfig               OPTIONAL -- Need OP
    ]]
}
SystemInformationBlockType2-v8h0-IEs ::=    SEQUENCE {
    multiBandInfoList                       SEQUENCE (SIZE (1..maxMultiBands)) OF AdditionalSpectrumEmission
        OPTIONAL, -- Need OR
    nonCriticalExtension                    SystemInformationBlockType2-v9e0-IEs    OPTIONAL
}
SystemInformationBlockType2-v9e0-IEs ::= SEQUENCE {
```

TABLE 2-continued

| | | | |
|---|---|---|---|
| ul-CarrierFreq-v9e0 | ARFCN-ValueEUTRA-v9e0 | OPTIONAL, -- | Cond |
| ul-FreqMax | | | |
|     nonCriticalExtension | SEQUENCE { } | OPTIONAL | |
| } | | | |
| AC-BarringConfig ::= | SEQUENCE { | | |
|    ac-BarringFactor | ENUMERATED { | | |
| |     p00, p05, p10, p15, p20, p25, p30, p40, | | |
| |     p50, p60, p70, p75, p80, p85, p90, p95}, | | |
|    ac-BarringTime | ENUMERATED {s4, s8, s16, s32, s64, s128, s256, s512}, | | |
|    ac-BarringForSpecialAC | BIT STRING (SIZE(5)) | | |
| } | | | |
| PTT-LocationInfo ::= | SEQUENCE { | | |
|    ptt-reportFrequency | ENUMERATED { | | |
| |     freq00, freq01, freq10, spare } | | |
|    ptt-reportNumber | ENUMERATED { | | |
| |     num0, num1, num2, spare } | | |
|    ptt-reportTimer | ENUMERATED { | | |
| |     timer0, timer1, timer2, spare } | | |
| } | | | |
| MBSFN-SubframeConfigList ::= | SEQUENCE (SIZE (1..maxMBSFN-Allocations)) OF | | |
| MBSFN-SubframeConfig | | | |
| -- ASN1STOP | | | |

The following Table 3 describes the parameters included in the SIB message defined in Table 2.

TABLE 3

SystemInformationBlockType2 field descriptions ac-BarringFactor
If the random number drawn by the UE is lower than this value, access is allowed. Otherwise the access is barred. The
values are interpreted in the range [0, 1): p00 = 0, p05 = 0.05, p10 = 0.10, . . . , p95 = 0.95. Values other than p00 can
only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
ptt-reportFrequency
Push-to-Talk UE's location information frequency: freq00 for everytime; freq01 for number-based reporting (i.e.,
every n-th PTT transmission UE report the latest location information); freq10 for timer-based reporting (every m sec).
ptt-reportNumber
every n-th PTT transmission UE report the latest location information. Values can be defined properly.
ptt-reportTimer
every m sec UE report the latest location information. Values can be defined properly.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in
SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6
corresponds to 6 resource blocks, n15 to 15 resource blocks and so on. If for FDD this parameter is absent, the uplink
bandwidth is equal to the downlink bandwidth. For TDD this parameter is absent and it is equal to the downlink
bandwidth.
ul-CarrierFreq
For FDD: If absent, the (default) value determined from the default TX-RX frequency separation defined in TS 36.101
[42, table 5.7.3-1] applies.
For TDD: This parameter is absent and it is equal to the downlink frequency.

In this case, fields and information elements (IEs) related to the location information of the UE are the ptt-reportFrequency field, the ptt-reportNumber field, and the ppt-reportTimer field.

The ppt-reportFrequency field indicates Push-to-Talk UE's location information frequency. For example, the ptt-reportFrequency field is set to 'freq00', the UE reports the latest location information for every time the UE performance random access for the MCPTT. If the ptt-reportFrequency field is set to 'freq01', the UE reports the location information as number-based reporting (i.e., every n-th PTT transmission UE report the latest location information). In addition, if the ptt-reportFrequency field is set to 'freq10', the UE report the location information base on timer in every m seconds.

The ptt-reportNumber field indicates that the UE report the latest location information every n-th PTT transmission. For example, if the ptt-reportNumber field is set to 'num1', the UE reports the location information every num1-th MCPTT transmission (i.e., num-1th random access procedure). That is, the number of the nth MCPTT transmission is indicated by the ptt-reportNumber field.

The ptt-reportTimer field indicates that the UE report the latest location information every m sec. For example, if the ptt-reportTimer field is set to 'timer2', the UE reports the location information every m second as the time2 value.

In this case, the ptt-reportNumber field and the ptt-reportTimer field are alternatively included in the SIB message. For example, if the ppt-reportFrequency field is set to 'freq00', the the ptt-reportNumber field and the ptt-reportTimer field are no needed to be included in the SIB. In addition, if the ptt-reportFrequency field is set to 'freq01', the ptt-reportNumber field can be included only. Lastly, if the ptt-reportFrequency field is set to 'freq10', the ptt-reportTimer field can be included only.

The following Table 4 is introduced to explain another SIB message defined in Table 2. For example, the ppt-reportFrequency, the ppt-reportNumber, and the ppt-reportTimer fields are not included in the SIB but the ue-TimersAndConstants IE is redefined as following Table 4.

In addition, the following Table 5 describes the parameters in the ue-TimersAndConstants IE.

TABLE 5

UE-TimersAndConstants field descriptions n3xy
Constants are described in section 7.4. n1 corresponds with 1, n2 corresponds with 2 and so on.
t3xy
Timers are described in section 7.3. Value ms0 corresponds with 0 ms, ms50 corresponds with 50 ms and so on.
n380
nNN means UE shall report its location information every (NN + 1)st PTT transmision.
t380
sNNN means NNN seconds, s010 means 10 seconds.

The ue-TimersAndConstants IE included in the SIB message can be used to indicate the timing of the location information of the UE. For example, if the t380 field is set to 'sNNN', the t380 field indicates that the UE has to report NNN second later after the timer has been started. In this case, the t380 field can be set as s000, s005, s010, s020, s060, s120, s180, or s300. In addition, if the n380 field is set to 'nNN', the n380 field indicates that the UE shall report its location information every (NN+1)st MCPTT transmission.

The n380 field and the t380 field can be alternatively included in the ue-TimersAndConstants IE according to the embodiments. For example, the UE is configured to report the location information in time base, the n380 field is not included in the ue-TimersAndConstants IE. On the other hand, if the UE is configured to report the location information in number of PTT talks, the t380 field is not included in the ue-TimersAndConstants IE.

3.4 Location Information Reporting According to SIBx Messages

Hereinafter, other aspects of embodiments of the present application will be described. Based on embodiments illustrated on section 3.2, following location information reporting methods are proposed.

Figure 9:
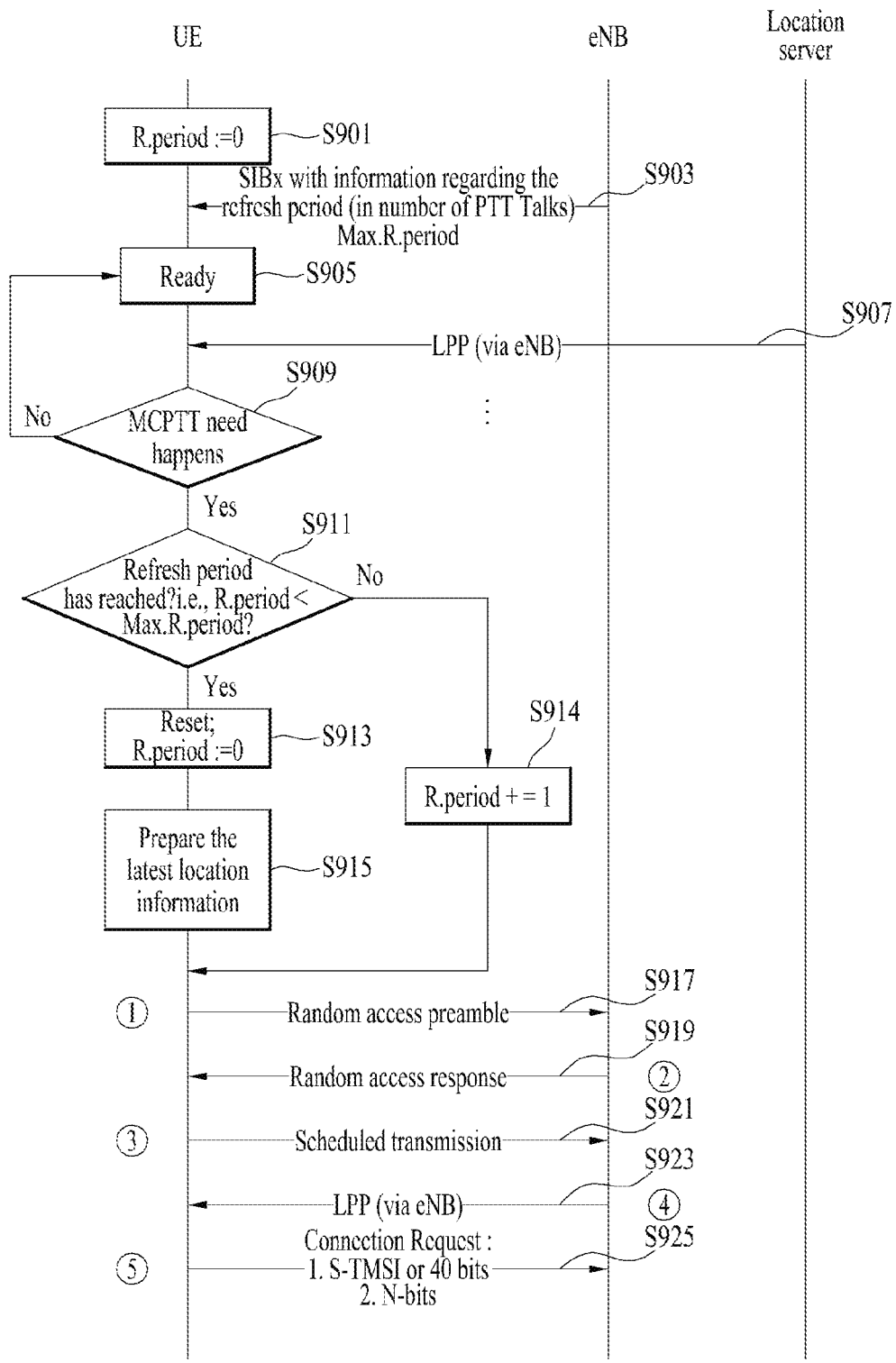
FIG. 9 illustrates a flowchart illustrating one of methods for reporting location information of the UE according to embodiments.

FIG. 9 illustrates a flowchart illustrating one of methods for reporting location information of the UE according to embodiments.

TABLE 4

```
-- ASN1START
UE-TimersAndConstants ::=   SEQUENCE {
    t300                    ENUMERATED {
                                ms100, ms200, ms300, ms400, ms600, ms1000, ms1500,
                                ms2000},
    t301                    ENUMERATED {
                                ms100, ms200, ms300, ms400, ms600, ms1000, ms1500,
                                ms2000},
    t310                    ENUMERATED {
                                ms0, ms50, ms100, ms200, ms500, ms1000, ms2000},
    t380                    ENUMERATED {
                                s000, s005, s010, s020, s060, s120, s180, s300},
    n310                        ENUMERATED {
                                n1, n2, n3, n4, n6, n8, n10, n20},
    t311                        ENUMERATED {
                                ms1000, ms3000, ms5000, ms10000, ms15000,
                                ms20000, ms30000},
    n311                        ENUMERATED {
                                n1, n2, n3, n4, n5, n6, n8, n10},
    n380                        ENUMERATED {
                                n00, n01, n02, n05, n10, n20, n40, n80},
    ...
}
-- ASN1STOP
```

The embodiment of FIG. 9 illustrates that the UE reports the location information to the eNB or the other PTT party based on a refresh period (R.period) in number of PTT talks (or, the number of random access procedure for the MCPTT) and a maximum number of the refresh period. In this case, the eNB can be seen as the MCPTT taking counterpart member depending on situation.

In FIG. 9, it is assumed that the UE and the eNB can support the MCPTT services and the location information of the UE can be managed and controlled by the location server.

In this case, the location server is a physical or logical entity (e.g., an Enhanced Serving Mobile Location Centre (E-SMLC) or a Secure User Plane Location (SUPL) SUPL Location Platform (SLP)) that manages positioning for a target device (e.g., the UE) by obtaining measurements and other location information from one or more positioning units and providing assistance data to positioning units to help determine this. The location server may also compute or verify the final location estimate. In addition, a LTE Positioning Protocol (LPP) is used point-to-point between a location server (e.g., E-SMLC or SLP) and the target device in order to position the target device using position-related measurements obtained by one or more reference sources transmitted from the eNB.

Referring to FIG. 9, the default value of the refresh period value is set to '0' in the UE (S901).

The eNB transmits system information block (SIB) including system information to be used in a cell managed by the eNB. For example, the system information includes parameters related to the refresh period and the maximum number of the refresh period (S903).

As a first aspect of the embodiment, the SIB defined in Table 2 and 3 can be used at step S903. In this case, the fields related to the refresh period and the maximum number of the refresh period are the ppt-reportFrequency field and the ppt-reportNumber field. For example, it is assumed that the ptt-reportFrequency field is set to 'freq01'. In this case, the UE reports the latest location information in every nth MCPTT transmission and the number of the nth PTT transmission is indicated by the ptt-reportNumber field.

As a second aspect of the embodiment, the SIB defined in Table 4 and 5 can be used at step S903. In this case, the field related to the refresh period and the maximum number of the refresh period is n380. That is, according to the value indicated by the n380 field, the UE reports the latest location information every (NN+1)st MCPTT transmission.

Referring back to FIG. 9, meanwhile, the UE is ready for MCPTT service and the UE may be in an idle state or normal state (S905).

The location server transmits a LPP message requesting location information of the UE. That is, the location server sends the LLP message (e.g., RequestLocationInformation message) to the UE to request the location information, indicating the type of location information needed and potentially the associated QoS (S907).

After receiving the LPP message, the UE check the MCPTT service is needed to be happened (S909).

If the MCPTT service is needed the UE also check whether the refresh period is over the maximum refresh period which is set based on the ptt-reportFrequency field and the ptt-reportNumber field or the n380 field (S911).

At the step S911, if the refresh period is not over the maximum refresh period, the UE add 1 to the refresh period and take a random access procedure for the MCTPP service (S914).

The UE repeats the step S909, S911, and S914 until the maximum refresh period will be reached.

At the step S911, if the refresh period is reached to the maximum refresh period, the UE resets the refresh period as '0' (S913) and prepares and stores the latest location information which had been measured in order to report the latest location information during a random access procedure (S915).

And then, the UE performs the random access procedure with the eNB as described on FIG. 5 or 6 and description thereof at the steps of S917 to S921.

During the random access procedure, the eNB is able to transmit the LPP message requesting the location information of the UE (S923).

If the UE receives the LPP message during the random access procedure, the UE transmits the RRC connection request message including the location information of the UE to the eNB during the random access procedure (S925).

The message format and the contents of the RRC connection request message can be referred to FIG. 8 and Table 1.

Figure 10:
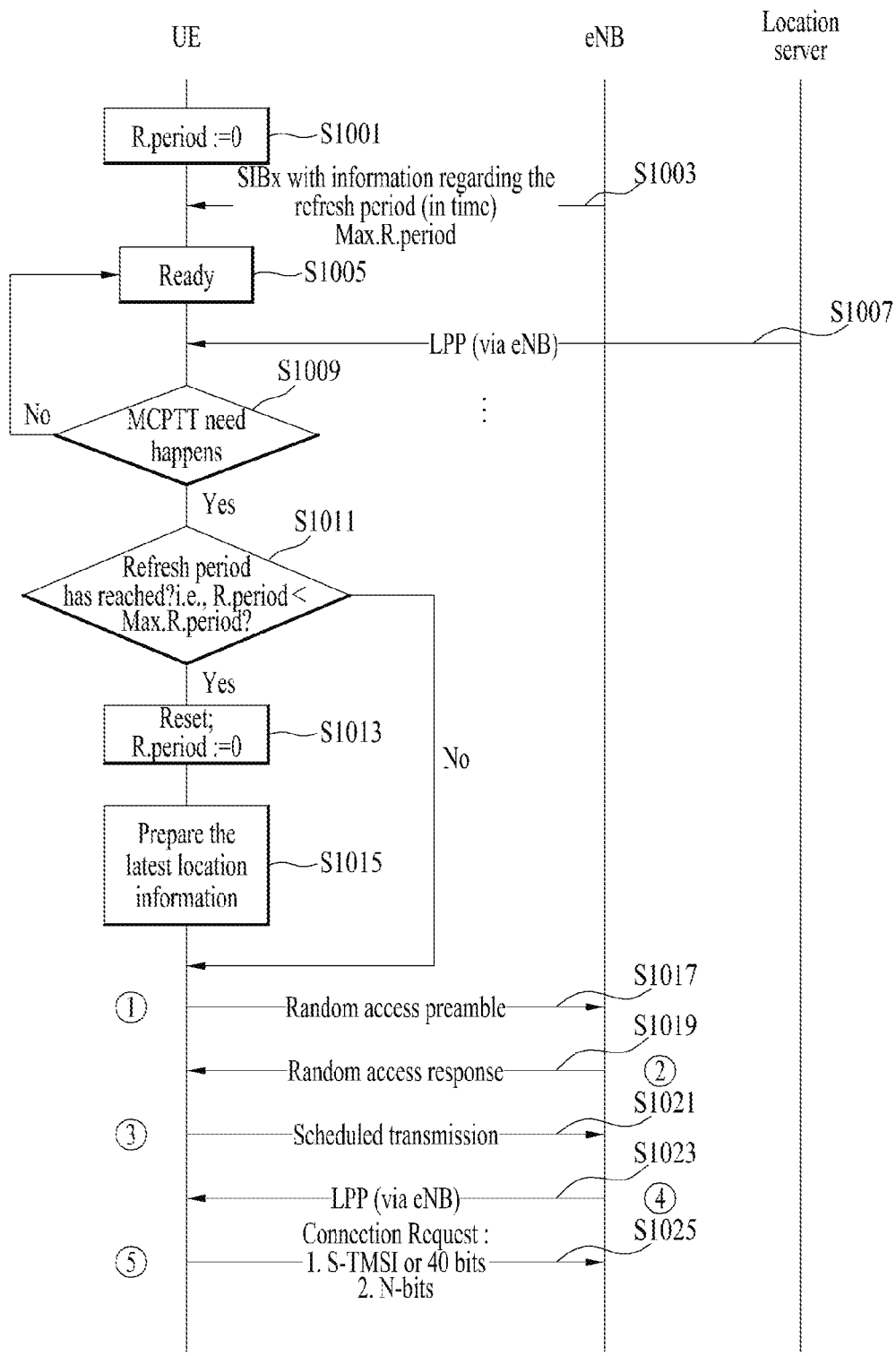
FIG. 10 illustrates a flowchart illustrating one of methods for reporting location information of the UE according to embodiments.

FIG. 10 illustrates a flowchart illustrating one of methods for reporting location information of the UE according to embodiments.

The embodiment of FIG. 10 illustrates that the UE reports the location information to the eNB or the other PTT party based on a refresh period (R.period) in time basis and a maximum number of the refresh period. In this case, the eNB can be seen as the MCPTT taking counterpart member depending on situation.

In FIG. 10, it is assumed that the UE and the eNB can support the MCPTT services and the location information of the UE can be managed and controlled by the location server.

In this case, the location server is a physical or logical entity (e.g., an Enhanced Serving Mobile Location Centre (E-SMLC) or a Secure User Plane Location (SUPL) SUPL Location Platform (SLP)) that manages positioning for a target device (e.g., the UE) by obtaining measurements and other location information from one or more positioning units and providing assistance data to positioning units to help determine this. The location server may also compute or verify the final location estimate. In addition, a LTE Positioning Protocol (LPP) is used point-to-point between a location server (e.g., E-SMLC or SLP) and the target device in order to position the target device using position-related measurements obtained by one or more reference sources transmitted from the eNB.

Referring to FIG. 10, the default value of the refresh period value is set to '0' in the UE (S1001).

The eNB transmits system information block (SIB) including system information to be used in a cell managed by the eNB. For example, the system information includes parameters related to the refresh period and the maximum number of the refresh period (S1003).

The refresh period and the maximum refresh period of FIG. 10 are set as different from FIG. 9. For example, the refresh period and the maximum refresh are set in time basis.

As a first aspect of the embodiment, the SIB defined in Table 2 and 3 can be used at step S1003. In this case, the fields related to the refresh period and the maximum number of the refresh period are the ppt-reportFrequency field and the ptt-reportTimer field. For example, it is assumed that the ptt-reportFrequency field is set to 'freq10'. In this case, the UE reports the latest location information in every m seconds and the time value is indicated by the ptt-reportTimer field.

As a second aspect of the embodiment, the SIB defined in Table 4 and 5 can be used at step S1003. The field related to the refresh period and the maximum number of the refresh period is t380 field. For example, if the t380 field is set to sNNN, the t380 field indicates that the UE has to report NNN seconds later after the timer has been started. In this case, the t380 field can be set as s000, s005, s010, s020, s060, s120, s180, or s300.

Referring back to FIG. 10, the UE is ready for MCPTT service and the UE may be in an idle state or normal state (S1005).

The location server transmits a LPP message requesting location information of the UE. That is, the location server sends the LLP message (e.g., RequestLocationInformation message) to the UE to request the location information, indicating the type of location information needed and potentially the associated QoS (S1007).

After receiving the LPP message, the UE check the MCPTT service is needed to be happened (S1009).

If the MCPTT service is needed, the UE also check whether the refresh period is reached to the maximum refresh period which is set based on the ppt-reportFrequency field and the ptt-reportTimer field or the t380 field included in the SIB (S1011).

At the step S1011, if the refresh period is not reached to the maximum refresh period, the UE takes a random access procedure for the MCTPP service and the UE repeats the steps S1009 and S1011 until the refresh period will be reached to the maximum refresh period.

At the step S1011, if the refresh period is reached to the maximum refresh period, the UE resets the refresh period as '0' (S1013) and prepares and stores the latest location information which had been measured in order to report the latest location information during a random access procedure (S1015).

And then, the UE performs the random access procedure with the eNB as described on FIG. 5 or 6 and description thereof at the steps of S1017 to S1021.

During the random access procedure, the eNB is able to transmit the LPP message requesting the location information of the UE (S1023).

If the UE receives the LPP message during the random access procedure, the UE transmits the RRC connection request message including the location information of the UE to the eNB during the random access procedure (S1025).

The message format and the contents of the RRC connection request message can be referred to FIG. 8 and Table 1.

As summaries the above disclosed embodiments of the present application, the UE of the present application reports the latest location information of the UE (1) whenever the UE performs the random access procedure for the MCPTT (see, FIG. 8), (2) every maximum refresh period in number of MCPTT talks is reached (see, FIG. 9), or (3) every maximum refresh period in time is reached (see, FIG. 10). Accordingly, the fields or the IEs can be defined according to the embodiments.

4. Apparatuses for Implementing the Aforementioned Methods

Figure 11:
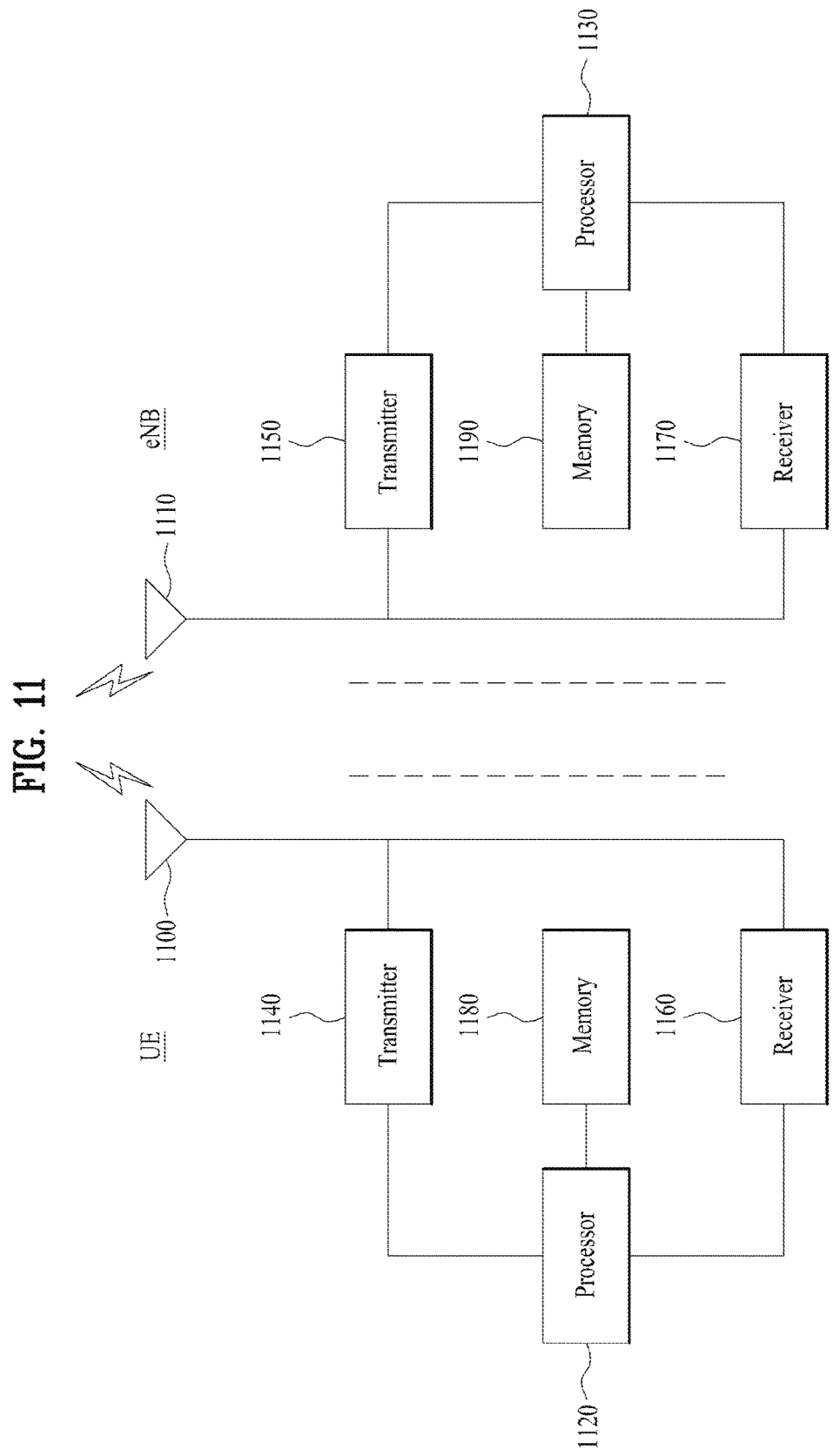
FIG. 11 shows apparatuses for implementing the above-mentioned methods described with reference to FIGS. 1 to 10.

FIG. 11 shows apparatuses for implementing the above-mentioned methods described with reference to FIGS. 1 to 10.

A UE can serve as a transmitting end on uplink and as a receiving end on downlink. An eNB can serve as a receiving end on uplink and as a transmitting end on downlink.

The UE and the eNB may include transmitter 1140 and 1150 and receiver 1160 and 1170 for controlling transmission and reception of signal, data and/or messages and antennas 1100 and 1110 for transmitting and receiving signal, data and/or messages, respectively. In this case, the UE may further include a screen to display user information such as a current time, a battery state, an event occurrence history, weather, and/or multimedia contents etc.

In addition, the UE and the eNB may respectively include processors 1120 and 1130 for performing the above-described embodiments of the present invention and memories 1170 and 1190 for storing processing procedures of the processors temporarily or continuously. For example, the processor of the UE is configured to measure the location information based on information/messages/signals from the eNB or upper entities. In addition, the processor of the UE is configured to report the location information during the random access procedure for the MCPTT services by using the transmitter. The detail of the embodiments of the present application can be referred to sections 1 to 3 as disclosed above.

The embodiments of the present invention can be performed using the aforementioned components and functions of the UE and the eNB. The transmitter 1140 and 1150 and the receiver 1160 and 1170 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) unit.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

The invention claimed is:

1. A method for reporting location information by a user equipment (UE) in a wireless access system supporting a Mission Critical Push to Talk (MCPTT) service, the method comprising:
receiving a system information block (SIB) message including a ptt-reportFrequency field,
wherein the ptt-reportFrequency field includes information related to a reporting of location information of the UE for the MCPTT service;
receiving a location information request message from a enhance Node B (eNB) during a random access procedure;
transmitting a connection request message including the location information of the UE for the MCPTT service through a control channel to the eNB based on the ptt-reportFrequency field; and
performing the MCPTT service with two or more users,
wherein the random access procedure is performed for an initiation of the MCPTT service, and
wherein the MCPTT service is used for public safety and utility services and provides communication among the two or more users with the UE.

2. The method according to claim 1, wherein the connection request message is transmitted during the random access procedure.

3. The method according to claim 1, wherein the connection request message is transmitted after the random access procedure.

4. The method according to claim 1,
wherein the ptt-reportfrequency field indicates reporting the location information (1) every random access procedure for the MCPTT, (2) every n-th random access procedure for the MCPTT, or (3) every m seconds.

5. The method according to claim 4, wherein if the ptt-reportfrequency field indicates reporting the location information every n-th random access procedure for the MCPTT, the SIB message further includes a ptt-reportNumber field indicating a number value of 'n' representing attempting number of the random access procedure, where 'n' is integer value.

6. The method according to claim 5, wherein the connection request message is transmitted only if a refresh period is reached to a maximum refresh period, and the maximum refresh period is set based on the ptt-reportfrequency field and the ptt-reportNumber field.

7. The method according to claim 4, wherein if the ptt-reportfrequency field indicates reporting the location information every m seconds, the SIB message further includes a ptt-reportTimer field indicating a time value 'm' for the random access procedure, where 'm' is integer value.

8. The method according to claim 7, wherein the connection request message is transmitted only if a refresh period is reached to a maximum refresh period, and the maximum refresh period is set based on the ptt-reportfrequency field and the ptt-reportTimer field.

9. A user equipment (UE) for reporting location information in a wireless access system supporting a Mission Critical Push to Talk (MCPTT) service, the UE comprising:
a receiver;
a transmitter; and
a processor configured to support of location information reporting by controlling the receiver and the transmitter,
wherein the processor is configured to:
receive, via the receiver, a system information block (SIB) message including a ptt-reportFrequency field,
wherein the ptt-reportFrequency field includes information related to a reporting of location information of the UE for the MCPTT service;
receive, via the receiver, a location information request message from a enhance Node B (eNB) during a random access procedure;
transmit, via the transmitter, a connection request message including the location information of the UE for the MCPTT service through a control channel to the eNB based on the ptt-reportFrequency field; and
perform, by controlling the receiver and the transmitter, the MCPTT service with two or more users,
wherein the random access procedure is performed for an initiation of the MCPTT service, and
wherein the MCPTT service is used for public safety and utility services and provides communication among the two or more users with the UE.

10. The user equipment according to claim 9, wherein the connection request message is transmitted during the random access procedure.

11. The user equipment according to claim 9, wherein the connection request message is transmitted after the random access procedure.

12. The user equipment according to claim 9,
wherein the ptt-reportfrequency field indicates reporting the location information (1) every random access procedure for the MCPTT, (2) every n-th random access procedure for the MCPTT, or (3) every m seconds.

13. The user equipment according to claim 12, wherein if the ptt-reportfrequency field indicates reporting the location information every n-th random access procedure for the MCPTT, the SIB message further includes a ptt-reportNumber field indicating a number value of 'n' representing attempting number of the random access procedure, where 'n' is integer value.

14. The user equipment according to claim 13, wherein the connection request message is transmitted only if a refresh period is reached to a maximum refresh period, and the maximum refresh period is set based on the ptt-reportfrequency field and the ptt-reportNumber field.

15. The user equipment according to claim 12, wherein if the ptt-reportfrequency field indicates reporting the location information every m seconds, the SIB message further includes a ptt-reportTimer field indicating a time value 'm' for the random access procedure, where 'm' is integer value.

16. The user equipment according to claim 15, wherein the connection request message is transmitted only if a refresh period is reached to a maximum refresh period, and the maximum refresh period is set based on the ptt-reportfrequency field and the ptt-reportTimer field.

* * * * *